United States Patent Office 3,496,139
Patented Feb. 17, 1970

3,496,139
EPOXY RESINS WITH REACTION PRODUCT OF A POLYSILOXANE AND AN AMINE
Mark Markovitz, Schenectady, N.Y., assignor to General Electric Company, a corporation of New York
No Drawing. Filed Dec. 20, 1966, Ser. No. 603,123
Int. Cl. C08g 30/14
U.S. Cl. 260—47
6 Claims

ABSTRACT OF THE DISCLOSURE

Epoxy resins containing 1,2-epoxy- groups are cured with the novel reaction products of alkoxy functional polysiloxanes and aliphatic hydroxy functional amines to produce materials having low dissipation factor, good corona resistance, heat resistance and other desirable physical characteristics.

---

This invention relates to new and useful amine functional polysiloxanes and epoxy resin compositions cured therewith. More perticularly, it relates to epoxy resins which are cured by amine functional silicones derived from the reaction of alkoxy functional polysiloxanes and aliphatic hydroxy functional amines to produce materials which are characterized by desirable physical characteristics.

The use of amines in curing epoxy resins is well known, such materials generally being characterized by fast curing and by a relatively short shelf life after resin and amine materials have been mixed together.

A primary object of this invention is to provide new amine functional polysiloxane curing agents and mixtures of epoxy resins and such materials which are characterized by good shelf life and when reacted by desirable physical and electrical characteristics including good corona resistance.

Those features of the invention which are believed to be novel are set forth with particularity in the claims appended hereto. The invention will, however, be better understood and further objects and advantages thereof appreciated from a consideration of the following description.

Briefly, the invention relates to new reaction products of alkoxy functional polysiloxanes and hydroxy functional amines and epoxy resins cured thereby.

In preparing the curing agents of the present invention, any of a number of alkoxy functional polysiloxanes can be used. Typical of such oligomer materials is a methoxylated polysiloxane having the average chemical structure of dimethyltriphenyltrimethoxytrisiloxane containing 20 percent methoxy groups and made under the name of Sylkyd 50 by Dow Corning. This material can be represented by the following formula

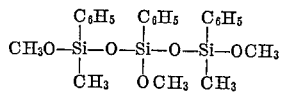

Among the various other polysiloxane materials which can be used in the present connection are SR–191 (15% by weight methoxy, General Electric Silicone Products Dept.), SR–196 (10% by weight methoxy, General Electric Silicone Products Dept.), and XR–6188 (15% by weight methoxy, Dow Corning). Any of a number of hydroxy functional amines can be used in connection with the present invention including aliphatic materials as well as aromatic materials although aromatic hydroxy amines have been found to react more slowly with the polysiloxane. It is essential that the amines have a hydroxy functionality. For example, there was no apparent reaction after heating for two hours at temperatures of from about 145° C. to 168° C. a polysiloxane such as that above with a mixture of m-phenylenediamine and bis(p-aminophenyl) methane.

Among the aliphatic hydroxy functional amines are ethanolamine, N-ethylethanolamine, N-aminoethyl ethanolamine, 1-amino-2-hydroxy propane, 1-amino-4-hydroxybutane, 1-amino-3-hydroxypropane, 5-amino-2-, 2-dimethyl-1-pentanol ("ADMP," Eastman Chemical Products, Inc.) 1-amino-6-hydroxyhexane, 3-amino-1-hexanol, 4-amino-1-pentanol, 2,4-diamine-1-butanol, 3,6-diamino-1-hexanol, cis- and trans-4-aminocyclohexanol. Among the aromatic hydroxy functional amines which are useful are m-aminophenol, p-aminophenol, p-aminophenethyl alcohol as well as materials such as 4-amino-1-naphthol, 3-amino-1-naphthol, 7-amino-1-naphthol, 4,6-diamino-1-naphthol, 3,5-diaminophenol, 2,4-diaminophenol, 4-hydroxy-4'-aminobiphenyl, 4-hydroxy-3'-aminobiphenyl, 4-amino-2-naphthol, 6-amino-2-naphthol. Generally about one equivalent of the hydroxy functional amine is used per alkoxy equivalent weight of polysiloxane and reacted by heating at reflux temperatures of from about 100° C. to 200° C., distilling off the alcohol formed during the reaction. Mixtures of amines and polysiloxanes can be used. The reaction mixture is then vacuum distilled to remove unreacted hydroxy amine except in the case of aromatic amines which are not readily separable.

Any of the usual epoxy resins having 1,2-epoxy groups are useful in connection with the present invention. Included are the usual bisphenol-A diglycidyl ether epoxy resins as well as those derived from polyolefins and glycerides or oils. Among other useful epoxy resins are the so-called epoxy novolac resins. Such resins are well known in the art and are set forth, for example, in many patents including 2,324,483; 2,444,333; 2,494,295; 2,500,600; and 2,511,913. Mixtures of epoxy resins can be used.

The following examples illustrate the preparation of the curing agents of the present invention, it being realized that these examples are representative only.

EXAMPLE 1

A mixture of 470 g. (3.0 methoxy equivalents) of Sylkyd 50 and 183 g. (3.0 equivalents) of ethanolamine were stirred and heated to reflux which was continued until about 71 g. (2.2 moles) of methanol had distilled from the reaction mixture. The mixture was then heated to distill off unreacted ethanolamine, the remaining liquid product having an average structure of 2.2 amine groups per trisiloxane molecule and a functionality of 4.4.

EXAMPLE 2

A mixture of 470 g. (3.0 methoxy equivalents) of Sylkyd 50 and 312 g. (3.0 equivalents) of N-aminoethyl ethanolamine were heated to reflux and 82 g. of methanol distilled, at which time the reaction mixture had become homogeneous. Unreacted amine was then distilled off, the remaining liquid product having an average structure of 2.6 $H_2NC_2H_4NHC_2H_4O$-groups per trisiloxane molecule and a functionality of 7.8.

EXAMPLE 3

Example 1 was repeated using 470 g. (3 methoxy equivalents) of Sylkyd 50 and 267 g. (3.0 equivalents) of N-ethyl ethanolamine, 2.5 moles (83% theoretical) of methanol being distilled off from the reaction mixture. The product remaining after removal of unreacted amine was a clear, yellowish liquid.

EXAMPLE 4

Example 1 was repeated using 470 g. (3 methoxy equivalents) of Sylkyd 50 and 218 g. (2.0 equivalents) of m-aminophenol, 1.8 moles or 90 percent of theoretical of methanol being distilled from the reaction mixture. The reaction product was solid at room temperature.

EXAMPLE 5

Example 1 was repeated using 470 g. (3 methoxy equivalents) of Sylkyd 50 and 218 g. (2.0 equivalents) of p-aminophenol, 1.6 moles or 80 percent of theoretical of methanol being distilled from the reaction mixture. The product was solid at room temperature.

EXAMPLE 6

Example 1 was repeated using as the reactants 470 g. (3 methoxy equivalents) of Sylkyd 50 and 274 g. (2.0 equivalents) of p-aminophenethyl alcohol, 2.0 moles of methanol or 100 percent of theoretical being removed during the reaction. The product was solid at room temperature.

The amine functional polysiloxanes of this invention are readily soluble in epoxy resins, the liquid materials dissolving at room temperature with the solid materials or those based on aromatic amines being heated generally at temperatures of from about 100 to 120° C. until fluid and then mixed with the epoxy resin. Epoxy novolac resins when used are generally heated at temperatures ranging from about 60 to 80° C. to decrease their viscosity and facilitate the blending therewith of the polysiloxane amine. Generally, the amine-epoxy resin mixtures are cured at temperatures of from about 50 to 160° C. for 1 to 15 hours, it being realized that various curing temperatures and times can be used to obtain specific characteristics. Generally speaking, the epoxy resin and curing agent are used in approximately stoichiometric quantities, that is, about one epoxy equivalent for each amine hydrogen equivalent weight. It will be realized, of course, that slight excesses of curing agent or epoxy resin may be used.

Shown in Table I below is the dissipation factor for various amounts of curing agent used in conjunction with Epon 828, a Shell Chemical Company Bisphenol-A diglycidyl ether epoxy resin having an epoxide equivalent weight of from about 185 to 192 and 25° C. viscosity of from 100 to 160 poises. The Shell catalyst Z indicated is a eutectic of m-phenylenediamine and bis(p-aminophenyl) methane.

TABLE I

| | | | | | | | | |
|---|---|---|---|---|---|---|---|---|
| Epon 828 | 188 | 188 | 188 | 188 | 188 | 188 | 188 | 188 |
| Sylkyd-50 ethanolamine | 116 | | | | | | | |
| Sylkyd-50 aminoethyl ethanolamine | | 87 | | | | | | |
| Sylkyd-50 m-aminophenol | | | 149 | | | | | |
| Sylkyd-50 p-aminophenethyl alc | | | | 159 | | | | |
| Sylkyd-50 p-aminophenol | | | | | 156 | | | |
| Sylkyd-50 ethyl ethanolamine | | | | | | 49 | 98 | 123 |
| Shell Cat. Z | | | | | | 30 | 23 | 19 |

Cure, 15 hrs. at 160° C.

| Temperature, °C.: | Dissipation Factor (60 cycles, 10 v.p.m.) | | | | | | | |
|---|---|---|---|---|---|---|---|---|
| 25 | .0046 | .0085 | .0057 | .002 | .001 | .0041 | .0030 | .0041 |
| 75 | .031 | .0077 | .0063 | .003 | .001 | .0040 | .043 | .058 |
| 100 | .36 | .032 | .030 | .035 | .027 | .015 | .10 | .26 |
| 125 | | | .011 | .013 | .012 | .14 | | |
| 150 | | | .091 | .055 | .042 | | | |

From the above it will be noted that generally the dissipation factors at elevated temperatures are lower for the aromatic amine cured materials.

Shown in Table II below is the variation in dissipation factor with temperature for various epoxy novolac structures. DEN 438 is a Dow material having a functionality of 3.6 and viscosity at 52° C. of 300 to 900 poises. DEN 431 is a Dow material having a functionality of 2.2 and viscosity at 52° C. of 14–20 poises and an epoxide equivalent weight of from about 172 to 179.

TABLE II

| | | | | | | | | |
|---|---|---|---|---|---|---|---|---|
| DEN 438 | 178 | 178 | 178 | 178 | 178 | 178 | | |
| DEN 431 | | | | | | | 176 | 176 | 176 |
| Sylkyd-50 ethanolamine | 116 | | | | | | | |
| Sylkyd-50 aminoethyl ethanolamine | | 87 | | | | | 87 | |
| Sylkyd-50 m-aminophenol | | | 149 | | | | | 149 |
| Sylkyd-50 p-aminophenethyl | | | | 170 | | | | 170 |
| Sylkyd-50 ethylethanolamine | | | | | 141 | 56 | | |
| Shell Cat. Z | | | | | 19 | 30 | | |

Cure: 15 hrs. at 160° C.

| Temperature, °C.: | Dissipation Factor (60 cycles, 10 v.p.m.) | | | | | | | |
|---|---|---|---|---|---|---|---|---|
| 25 | .0065 | .0085 | .0056 | .003 | .0075 | .0076 | .0084 | .005 | .0043 |
| 75 | .014 | .0098 | .0068 | .003 | | | .0095 | .008 | .0099 |
| 100 | .083 | .020 | .0088 | .009 | .016 | .012 | .024 | .013 | .034 |
| 125 | | .11 | .023 | .020 | | .041 | .45 | .023 | .065 |
| 150 | | .87 | .023 | .021 | | .29 | | .094 | .65 |
| 175 | | | .142 | | | | | | |

Shown in Table III below is the heat distortion temperature in degrees C. and at 264 p.s.i. of epoxy resin samples cured with the aliphatic polysiloxane amine materials of the invention. The Dow DER 332 material indicated is a bisphenol-A diglycidyl ether epoxy having an epoxide equivalent weight of 172 to 178 and 25° C. viscosity of 40 to 64 poises, the sample used being a bar one-half inch square by five inches long.

TABLE III

| | | | | | | | | |
|---|---|---|---|---|---|---|---|---|
| Epon 828 | 188 | 188 | | | | | | |
| DER 322 | | | 175 | 175 | | | | |
| DEN 431 | | | | | 176 | 176 | | |
| DEN 438 | | | | | | | 178 | 178 |
| Sylkyd-50 ethanolamine | 116 | | 116 | | 116 | | 116 | |
| Sylkyd-50 aminoethyl ethanolamine | | 87 | | 87 | | 87 | | 87 |

Cure: 4 hrs. at 80–160° C. plus 15 hrs. at 160° C.

| | Temperature, °C. | | | | | | | |
|---|---|---|---|---|---|---|---|---|
| Mils Deflection: | | | | | | | | |
| 1 | 53 | 81 | 50 | 83 | 54 | 86 | 71 | 94 |
| 5 | 60 | 89 | 58 | 93 | 61 | 85 | 73 | 110 |
| 10 (HDT) | 62 | 92 | 60 | 96 | 65 | 98 | 78 | 117 |

Shown in Table IV below is the heat distortion temperature for various aromatic polysiloxane amine materials.

compositions are useful as putty and coating materials, as impregnants or binders for other materials such as mica flakes, mica paper fabrics, glass roving and the like.

TABLE IV

|  |  |  |  |  |  |  |  |  |
|---|---|---|---|---|---|---|---|---|
| Epon 828 | 188 | 188 |  |  |  |  |  |  |
| DER 332 |  |  | 175 | 175 |  |  |  |  |
| DEN 431 |  |  |  |  | 176 | 176 |  |  |
| DEN 438 |  |  |  |  |  |  | 178 | 178 |
| Sylkyd-50 aminophenethyl alc. | 170 |  | 170 |  | 170 |  | 170 |  |
| Sylkyd-50 m-aminophenol |  | 145 |  | 145 |  | 145 |  | 145 |
| Cure: 4 hrs. at 80–160° C plus 15 hrs. at 160° C. |  |  |  |  |  |  |  |  |

| Mils Deflection: | Temperature, °C. | | | | | | | |
|---|---|---|---|---|---|---|---|---|
| 1 | 55 | 67 | 51 | 68 | 55 | 68 | 57 | 72 |
| 5 | 63 | 77 | 61 | 78 | 62 | 78 | 75 | 87 |
| 10 (HDT) | 67 | 80 | 65 | 82 | 68 | 82 | 82 | 93 |

Shown in Table V below are various physical characteristics of Epon 828 as cured with the present materials including tensile strength, tensile modulus and elongation at 25° C.

TABLE V

|  |  |  |  |  |  |  |
|---|---|---|---|---|---|---|
| Epon 828 | 188 | 188 | 188 | 188 | 188 | 188 |
| Sylkyd-50 aminoethyl ethanolamine | 87 |  |  |  |  |  |
| Sylkyd-50 m-aminophenol |  | 149 |  |  |  |  |
| Sylkyd-50 p-aminophenethyl alc. |  |  | 159 |  |  |  |
| Sylkyd-50 ethyl ethanolamine |  |  |  | 49 (.2) | 98 (.4) | 123 (.5) |
| Shell Cat. Z |  |  |  | 30 (.8) | 23 (.6) | 19 (.5) |
| Cure: 15 hrs. at 160° C. |  |  |  |  |  |  |
| Tensile Strength, p.s.i. | 9,200 | 11,400 | 8,700 | 11,300 | 8,200 | 4,100 |
| Percent Elongation at break | 5.8 | 7.1 | 9.3 | 7.2 | 4.6 | 3.0 |
| Tensile modulus, p.s.i. | $1.9 \times 10^5$ | $2.3 \times 10^5$ | $1.8 \times 10^5$ | $2.1 \times 10^5$ | $2.1 \times 10^5$ | $1.8 \times 10^5$ |

Shown in Table VI below are the tensile strength, tensile modulus and elongation at 25° C. of epoxy novolacs cured with the present curing agents.

TABLE VI

|  |  |  |  |  |
|---|---|---|---|---|
| DEN 438 | 178 | 178 | 178 |  |
| DEN 431 |  |  |  | 176 |
| Sylkyd-50 ethanolamine | 116 |  |  |  |
| Sylkyd-50 aminoethyl ethanolamine |  | 87 |  | 87 |
| Sylkyd-50 m-aminophenol |  |  | 149 |  |
| Cure: 15 hrs. at 160° C. |  |  |  |  |
| Tensile strength, p.s.i. | 10,400 | 6,800 | 9,950 | 10,700 |
| Percent Elongation at break | 6.0 | 4.1 | 5.9 | 6.0 |
| Tensile modulus, p.s.i. | $2.0 \times 10^5$ | $1.9 \times 10^5$ | $2.3 \times 10^5$ | $2.2 \times 10^5$ |

Shown in Table VII below is the corona resistance using a needle point electrode in air at 105° C., 3,000 cycles and 2500 volts, the thickness of the sample being 30 mils.

TABLE VII

| Sample | Avg. Failure Time | Range |
|---|---|---|
| Epoxy Resin-N-aminoethyl piperazine | 17 hrs | 3–23 hrs. |
| Epoxy resin-carboxylic acid hardener | 18 hrs | 6–31 hrs. |
| Polyethylene terephthalate | 21 hrs | 17–26 hrs. |
| Polyimide | 41 hrs |  |
| DER-332-Sylkyd-50 aminoethyl ethanolamine |  | 1st failure at 3,299 hours |
| DER-332-Sylkyd-50 ethanolamine |  | No failures after 3,600 hours |
| Silicone rubber |  | 1st failure at 5,566 hours |

From the above table it will be immediately apparent that the corona resistance of the present material is much improved over epoxy resins cured with ordinary amines or acidic material, the present materials approaching the salutary corona resistance of silicone rubber itself.

There are provided, then, by the present invention new amine functional polysiloxanes which are useful in preparing cured epoxy resin compositions having good physical and electrical characteristics. The epoxy resin compositions are useful as putty and coating materials, as impregnants or binders for other materials such as mica flakes, mica paper fabrics, glass roving and the like.

What I claim as new and desire to secure by Letters Patent of the United States is:

1. A composition comprising an epoxy resin with 1, 2 epoxy groups having as a curing agent the reflux heat reaction products of dimethylphenyltrimethoxytrisiloxane and an amine selected from the group consisting of ethanolamine, N-aminoethyl ethanolamine, N-ethylethanolamine, aminophenol, aminophenethyl alcohol and mixtures thereof, said amine being present in the amount of about one equivalent of said amine per methoxy equivalent of polysiloxane, said composition containing about one epoxy equivalent per amine hydrogen equivalent weight.

2. A composition as in claim 1 in which said amine is ethanolamine.

3. A composition as in claim 1 in which said amine is N-aminoethyl ethanolamine.

4. A composition as in claim 1 in which said amine is N-ethylethanolamine.

5. A composition as in claim 1 in which said amine is aminophenol.

6. A composition as in claim 1 in which said amine is aminophenethyl alcohol.

References Cited

UNITED STATES PATENTS

| 3,200,031 | 8/1965 | Rittenhouse | 260—824 |
| 3,247,280 | 4/1966 | Kanner | 260—824 |

FOREIGN PATENTS

| 1,254,361 | 1/1961 | France. |

WILLIAM H. SHORT, Primary Examiner

T. PERTILLA, Assistant Examiner

U.S. Cl. X.R.

117—123, 124; 260—2, 18, 59, 824

UNITED STATES PATENT OFFICE
CERTIFICATE OF CORRECTION

Patent No. 3,496,139    Dated February 17, 1970

Inventor(s) Mark Markovitz

It is certified that error appears in the above-identified patent and that said Letters Patent are hereby corrected as shown below:

Column 6, line 30, "dimethylphenyltrimethoxytrisiloxane" should read -- dimethyltriphenyltrimethoxytrisiloxane -- .

Signed and sealed this 2nd day of January 1973.

(SEAL)
Attest:

EDWARD M. FLETCHER, JR.
Attesting Officer

ROBERT GOTTSCHALK
Commissioner of Patents